United States Patent
Coutu

Patent Number: 5,984,267
Date of Patent: *Nov. 16, 1999

[54] APPARATUS FOR ISOLATING AND CONTAINING REACTIVE MEDIUM

[75] Inventor: Roger R. Coutu, Hooksett, N.H.

[73] Assignee: Millipore Corporation, Bedford, Mass.

[*] Notice: This patent is subject to a terminal disclaimer.

[21] Appl. No.: 08/921,059

[22] Filed: Aug. 29, 1997

Related U.S. Application Data

[63] Continuation-in-part of application No. 08/711,525, Sep. 10, 1996, Pat. No. 5,738,335.

[51] Int. Cl.⁶ .................................................. F16L 29/00
[52] U.S. Cl. ........................................ 251/149.4; 251/331
[58] Field of Search ............................ 251/149.4, 149.1, 251/331

[56] References Cited

U.S. PATENT DOCUMENTS

| | | | |
|---|---|---|---|
| 5,591,332 | 1/1997 | Reid et al. | 251/149.4 X |
| 5,738,335 | 4/1998 | Coutu | 251/149.4 |

*Primary Examiner*—Kevin Lee
*Attorney, Agent, or Firm*—John Dana Hubbard; Timothy J. King

[57] ABSTRACT

A device for isolating and containing gas reactive materials includes a novel valve arrangement that is actuatable in conjunction with the movement of a pre-loaded metal diaphragm. The pre-loaded diaphragm force is sufficient to form a fluid tight seal when the device is disconnected from a gas supply line thereby sealing the interior of the device from the surrounding environment.

12 Claims, 5 Drawing Sheets

APPARATUS FOR ISOLATING AND CONTAINING REACTIVE MEDIUM

This application is a continuation-in-part of application Ser. No. 08/711,525 filed Sep. 10, 1996, U.S. Pat. No. 5,738,335.

BACKGROUND OF THE INVENTION

This invention relates generally to devices for isolating and containing gas reactive materials. Particularly, this invention relates to gas purifiers, filters and monitors that are useful in the microelectronics manufacturing industry. More particularly, this invention relates to gas purifiers having an in-gland diaphragm valve assembly for isolating and containing gas to be purified from the surrounding environment.

Devices of various types for purifying, filtering or monitoring gases are used widely in the industry. For example, gases used in the fabrication of semiconductors must be of ultrahigh purity as the semiconductor chip geometry has become smaller. Gas purifiers have been used in the microelectronics industry for many years to remove molecular and particulate contamination from these gases.

Since many of the gases used in semiconductor manufacturing are toxic or corrosive, they can pose environmental and health concerns if they become exposed to the surrounding environment. Gas purifiers are typically disposable devices since the reactive material used as the purifier element is consumed upon use. Additionally, upon installation the surrounding environment can enter the purifier thereby consuming a portion of its useful life. This exposure to the surrounding environment also lengthens the preparation time for the gas line as moisture and other impurities must be purged from the system prior to use. Consequently, there is a need to isolate the purifier from the gas supply line and to contain any gas within the purifier during installation and removal of the purifier. Most often this isolation and containment during changeout of the purifier is accomplished through the use of a pair of isolation valves positioned externally of the purifier element adjacent the inlet and outlet fittings which attach the purifier to the gas supply line. The primary function of the isolation valves is to enhance safety when removing the disposable purifier from the gas line during maintenance and to protect the reactive purifier material from exposure to the surrounding environment. However, the disadvantage of using external isolation valves is that they are expensive, increase the internal volume of the system and also add to the overall bulkiness of the purifier. Such bulkiness creates significant additional costs, especially since semiconductors are manufactured in a clean room environment.

Attempts have been made to eliminate the need for external valves in gas purifiers. An example of such a design is shown in U.S. Pat. No. 5,139,747 which discloses a gas purifier with poppet valves which are integrally located within the purifier element thereby eliminating the need for external valves. Because specially designed gaskets are used, a large force is required to actuate the poppet valves. Thus, this patent teaches using a pair of spring stacks, one at the inlet and the other at the outlet, to apply sufficient force on the poppet valve necessary to make a reliable seal. FIG. 1 is a cross-section of a poppet valve arrangement representative of the type used in U.S. Pat. No. 5,139,747. The use of springs is undesirable because they are a potential source of contamination due to their increased surface area, the majority of which is not swept by the fluid thereby producing significant dead volume. Also, springs are prone to stress cracking of the surface of the spring material which could product contaminants. In addition, the valve of this patent is assembled using press-fit machine components, a technique which creates trapped areas or dead volumes inside the unit. Dead volume areas can entrap fluids causing corrosion to occur which could ultimately effect the purity of the supply gas. Also, for ultrapure applications, such as commonly encountered in the microelectronics industry, it is highly desirable to electropolish the finishes of those surfaces which come in contact with the supply gas. It is known that springs are very difficult to electropolish and thus are more susceptible to corrosion.

Accordingly, the need exists for an improved gas isolation and containment device of simpler design and with reduced dead volume and improved surface finishes to avoid contaminants from entering the gas stream being purified and monitored. Moreover, there is a need to be able to change these devices without exposing personnel to hazardous gases and to install replacement devices without exposing the reactive material to the surrounding environment.

SUMMARY OF THE INVENTION

The present invention overcomes the disadvantages and drawbacks of the prior art by providing a device for isolating and containing gas reactive materials with a novel valve that is actuatable in conjunction with the movement of a pre-loaded metal diaphragm. Each of the fittings which connect the device to a gas line to be purified or monitored interact with a valve assembly and an actuator which is connected to the diaphragm, all of which are contained within the housing of the separation device.

In accordance with the preferred embodiment of the present invention, a gas purifier incorporates a pair of in-gland valves, one of which is at the inlet and the other of which is at the outlet, for isolation and containment purposes. The gas purifier includes a metal diaphragm and a corresponding metal seat which forms a reliable fluid tight seal when the gas purifier is not connected to a gas supply line, as for example gas lines used in a semiconductor manufacturing operation. This sealing is accomplished by the pre-loaded bias force of the diaphragm which is such that the diaphragm engages the metal seat thereby sealing the interior of the purifier and any entrained gas that has been purified from the surrounding environment. Attached to the diaphragm is an actuator which extends longitudinally beyond the purifier's inlet and outlet fittings such that when the fittings are coupled to a gas supply line, a force is generated on the actuator which is sufficient to overcome the pre-loaded bias force of the metal diaphragm thereby exposing both the inlet and outlet of the gas supply line to the gas purifier.

These and other advantages and features of the present invention will become apparent from a reading of the following detailed description taken in conjunction with the appended drawings.

DETAILED DESCRIPTION OF THE INVENTION

Figure 1:
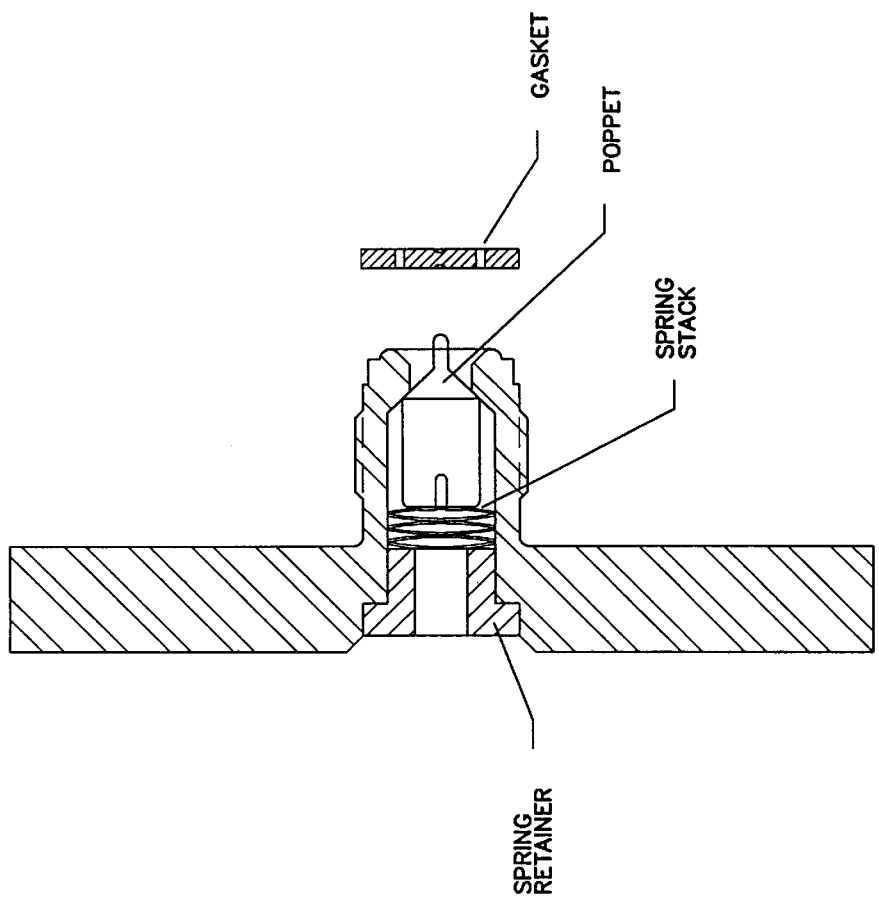
FIG. 1 is a cross-section of the valve assembly of a prior art gas purifier with an integral, spring-actuated poppet valve.
Figure 2:
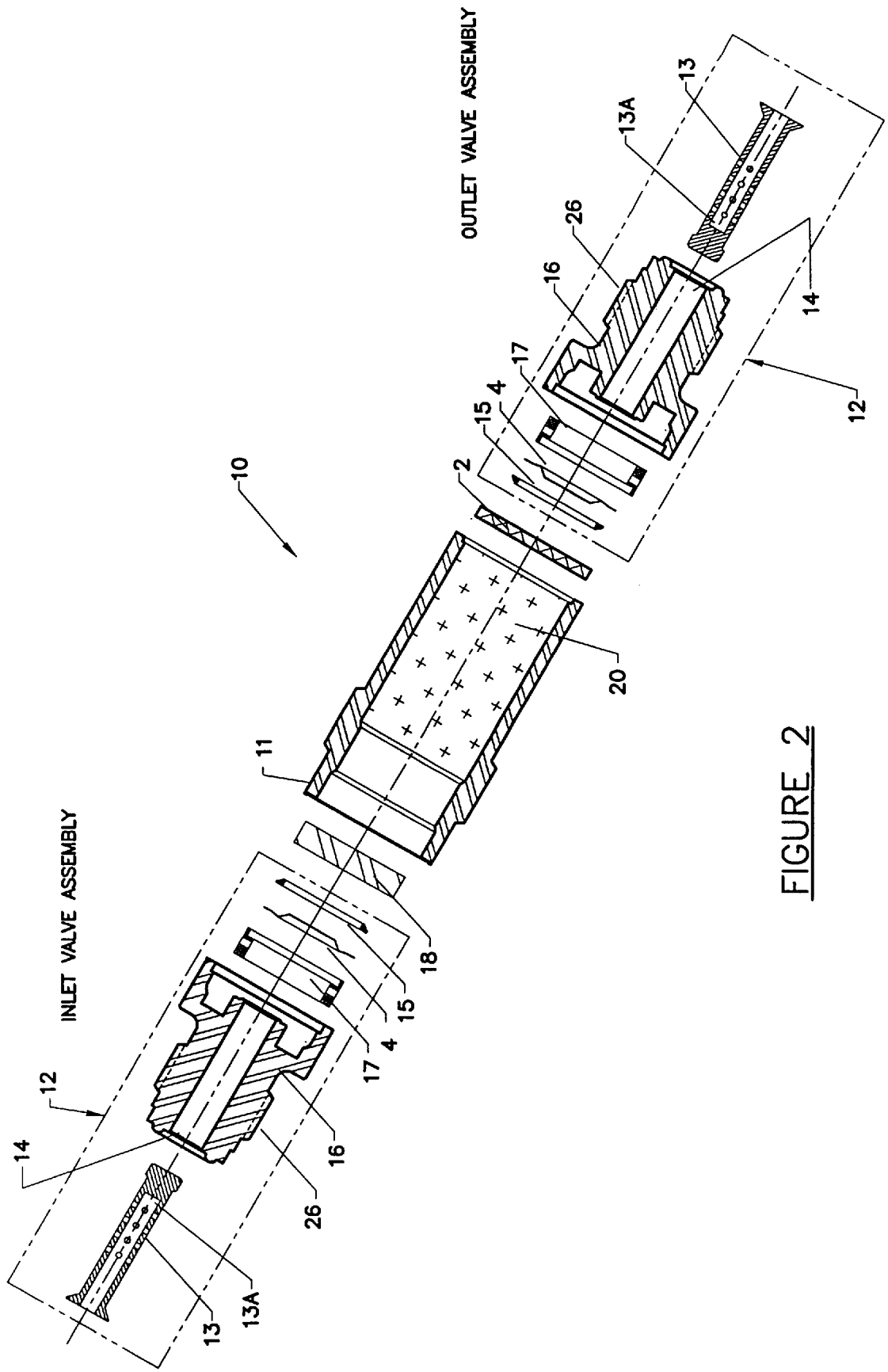
FIG. 2 is an exploded view of the preferred embodiment of the gas purifier of the present invention.
Figure 3:
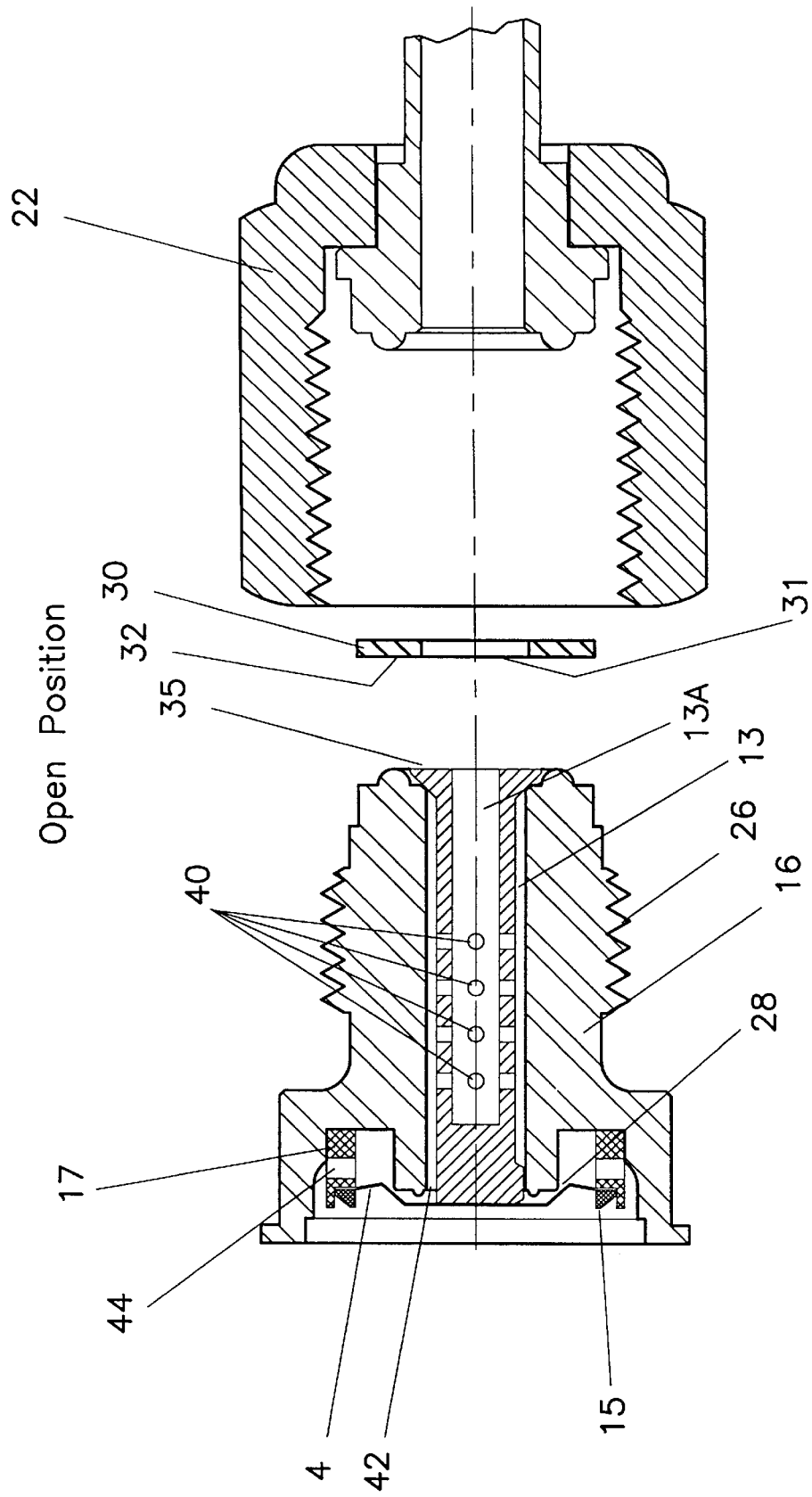
FIG. 3 is a cross-section of a valve assembly of the embodiment of FIG. 2 showing details of the metal valve and its seat.

A preferred embodiment of the present invention is shown in FIGS. 2 and 3. FIG. 2 is an exploded view of a gas purifier 10 showing each of the components which are assembled into purifier body 11. Each end of the purifier body contains a valve assembly 12, which includes a tubular actuator rod 13 with hollow inner bore 13A which is adapted to be inserted into central bore 14 of valve body 16. A valve manifold 17 is located on the opposite end of body 16.

The valve assembly 12 is assembled by welding the manifold 17 to valve body 16, and then welding a metal diaphragm 4 and a diaphragm retainer 15 to the valve manifold. Each of the valve assemblies is of identical construction and may thus be interchangeable with one another. The orientation of the purifier within the gas supply line determines which valve functions as an inlet valve and which as an outlet valve. Generally, the inlet valve, which is positioned ahead of the purifier, is at the upstream end of the gas supply and the outlet valve is at the downstream end, i.e. after the purifier.

To complete the construction of the purifier 10, a membrane filter 2 is sandwiched between the downstream end of purifier body 11 and the outlet valve assembly 12, and the outlet valve assembly is welded to the purifier body. The purifier is filled with an inorganic resin 20 purifier material such as the type described in U.S. Pat. Nos. 4,950,419; 4,853,148 and 4,713,224. Such resin is a high surface area inorganic support coated with a material capable of reacting with constituents or contaminants contained in the gas stream. It will be appreciated by those of skill in the art that other materials may be employed depending on the application (e.g. purification or monitoring). These include getter alloys such as those described in U.S. Pat. Nos. 4,312,669 and 5,456,740, organometallic resin-based materials as disclosed in U.S. Pat. Nos. 4,604,270 and 4,761,395 or reactive micro matrix materials as described in U.S. Pat. No. 5,340,552. A porous frit 18 is inserted in the upstream end of the purifier body to contain the resin. The inlet valve assembly 12 is then welded to the purifier body to complete the assembly of the gas purifier.

The metal diaphragm 4 is a high yield, high tensile strength metal alloy, with a particularly useful diaphragm being formed of the Elgiloy® alloy which is a mixture of cobalt, chromium and nickel. The diaphragm is 0.004 inch thick and is formed of corrugated construction. When the valve is assembled, the diaphragm is deflected approximately 0.005 inches which applies a force greater than 20 pounds to its seat 28 thereby assuring a fluid tight metal seal. The actuator rod 13 is spot welded to the diaphragm.

Referring to FIG. 3, the operation of the purifier and its valve mechanism will now be described. When the mating connector 22 of the gas supply line plumbing is connected to threaded end 26 of inlet valve assembly 12, a gasket 30 acts against the actuator rod 13, whose end extends laterally beyond the threaded end to form flared end 35. Solid peripheral region 32 of the gasket contacts the flared end and tightening the connector 22 produces a sufficient amount of force to overcome the pre-loaded bias force of the metal diaphragm 4 thereby opening the valve by moving the metal diaphragm off the seat 28 on the inside of the valve assembly. FIG. 3 shows the valve in the open position. The gasket 30 is disk shape and has a circular hole 31 which aligns with the inner bore 13A of the tubular actuator rod. Since hole 31 has a smaller diameter than the flared end 35, solid peripheral region 32 of gasket 30 contacts the flared end and compresses upon tightening the mating connector 22. Solid peripheral region 32 pushes against flared end 35 of actuator rod 13 thereby displacing metal diaphragm 4 and opening the valve assembly.

The supply of gas passes through hole 31 and inner bore 13A of actuator rod 13 and then out of a series of radial holes 40 located in the actuator rod. Gas then flows through an annular slit 42 past valve seat 28 then through radial holes 44 in the valve manifold 17. The gas to be purified then enters the purifier body 11 passing through resin 20 where purification occurs and finally through membrane filter 2 to the outlet valve assembly 12 where the reverse flow path to that described above occurs. The purified gas is then supplied to a point of use.

When the purifier 10 is to be removed from the gas supply line, each mating connector 22 of the supply line is loosened from threaded end 26. This causes the inner surface of the metal diaphragm 4, which has sufficient pre-loaded force, to seal against seat 28. Thus any gas entrapped within the purifier body is not allowed to escape to the surrounding environment. It will also be appreciated that this configuration (i.e. when the purifier is not connected to a gas supply line) allows a new or replacement purifier to have its reactive material sealed from the surrounding environment.

Figure 4:
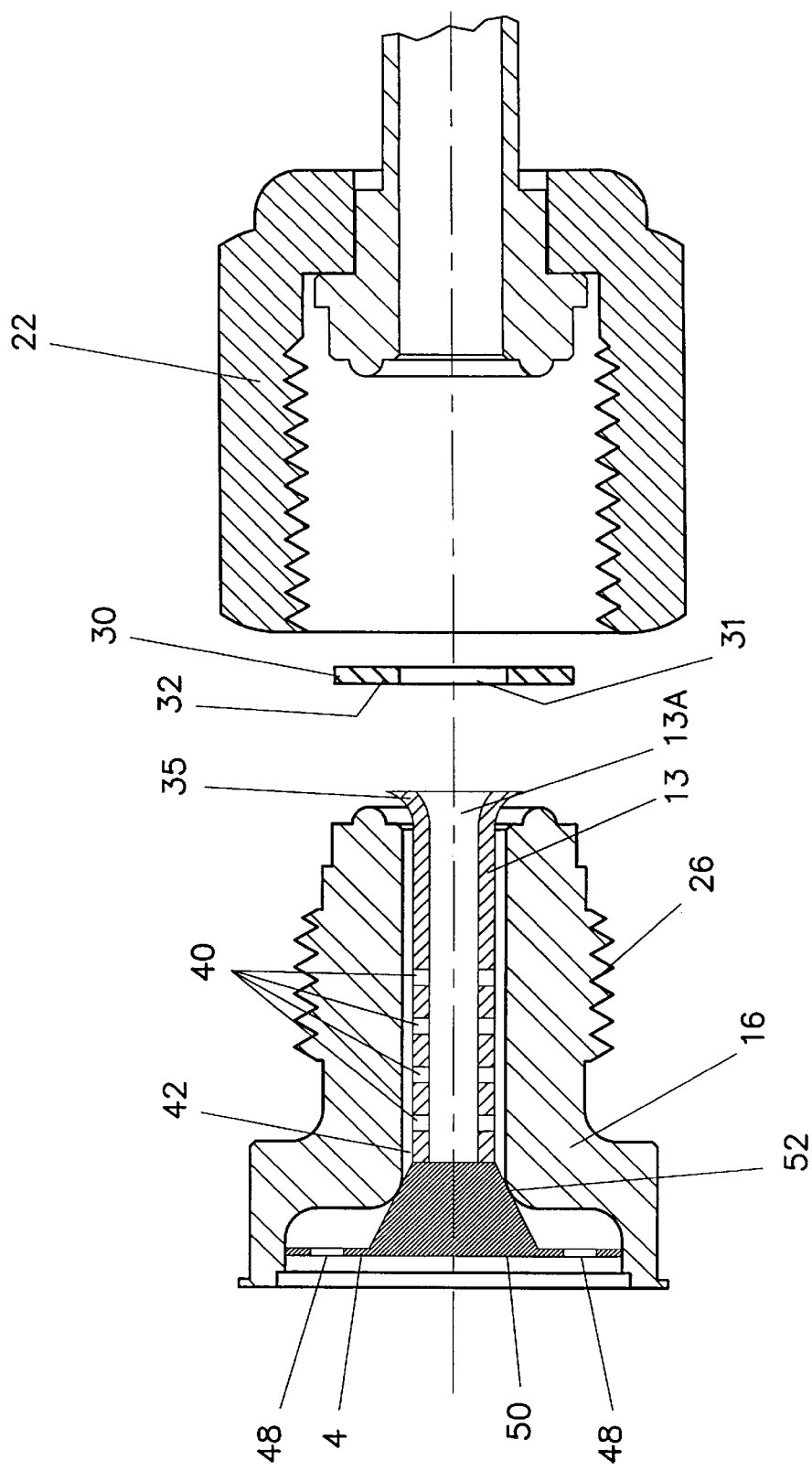
FIG. 4 is a cross-section of a valve assembly of an alternate embodiment of the present invention.

FIG. 4 shows an alternate embodiment of the valve assembly of the present invention wherein like numerals refer to like elements of the embodiment previously described. In this embodiment, a tapered valve 50 is welded to the metal diaphragm 4 and the tapered end of the valve mates with valve seat 52 located on the valve body 16. When the valve is in the closed position, as shown, a fluid tight seal is made. Considering the valve assembly as representing an inlet valve of the purifier 10, the operation is similar to that as described with respect to the preferred embodiment with flow proceeding through gasket hole 31, the inner bore 13A of actuator rod 13, radial holes 40 and annular slit 42. However, in this embodiment when the valve 50 is caused to be removed from its seat 52, gas flow proceeds through a series of holes 48 in the metal diaphragm 4 to the remaining elements of the purifier.

Figure 5:
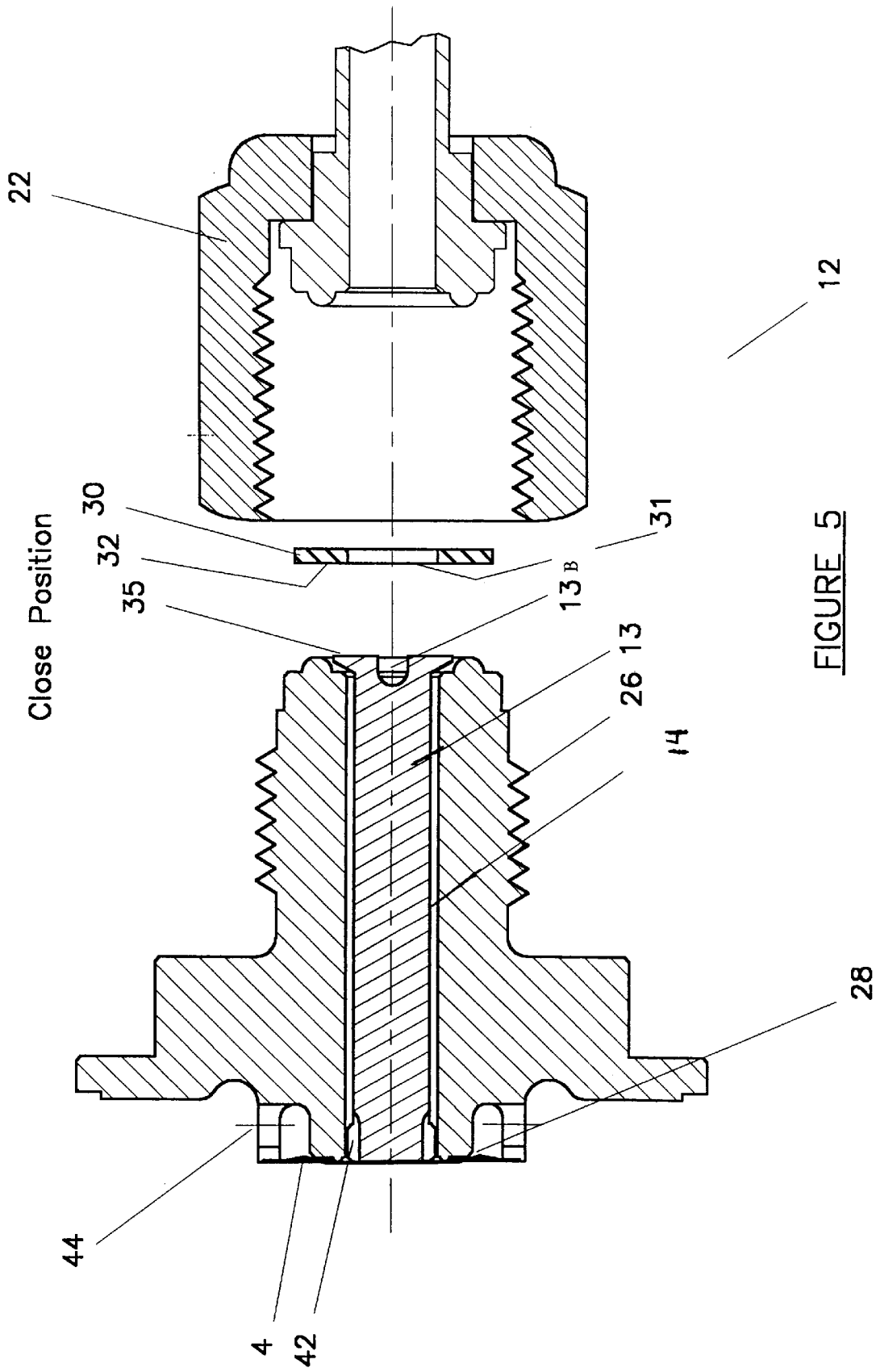
FIG. 5 is a cross-section of a valve assembly of an alternate embodiment of the present invention.

FIG. 5 shows an alternate embodiment of the valve assembly of the present invention wherein like numerals refer to like elements of the embodiment previously described. In this embodiment, the actuator rod 13 is a solid metal rod, rather than the tubular actuator rod of the other preferred embodiment. The rod is adapted to be inserted into the central bore 14 of the valve body 22. A slot 13B is located in the rod 13 adjacent the end opposite of that which contains the metal diaphragm 4. The slot 13B is in communication with the central bore 14.

The operation of the valve mechanism of the embodiment shown in FIG. 5 will be described. When the mating connector 22 of the gas supply line plumbing is connected to threaded end 26 of the inlet valve assembly 12, a gasket 30 acts against the actuator rod 13, whose end extends laterally beyond the threaded end to form flared end 35. Solid peripheral region 32 of the gasket contacts the flared end and tightening the connector 22 produces a sufficient amount of force to overcome the preloaded bias force of the metal diaphragm 4. This opens the valve by moving the metal diaphragm off the seat 28 on the inside of the valve assembly. FIG. 5 shows the valve in the closed position. The gasket 30 is disk shape and has a hole 31 that aligns with the inner slot 13B of the actuator rod 13. Since the hole 31 has a smaller diameter than the flared end 35, solid peripheral region 32 of the gasket 30 contacts the flared end and compresses upon tightening of the mating connector 22. Solid peripheral region 32 pushes against flared end 35 of actuator rod 13 thereby displacing metal diaphragm 4 and opening the valve. The supply of gas passes through hole 31 and slot 13B of actuator rod 13 into the central bore 14 of the valve, then enters the annular slit 42 past valve seat 28 then through radial holes 44 in the mating connector 22.

While the foregoing examples illustrate the versatility and essential features of the present invention, it should be understood that there are numerous variations that may be preferable alternatives to those presented here in certain instances. Examples of variations which are intended to be covered by this invention as defined in the accompanying claims include the following products which require isolation from contaminating environments such as ambient air, namely getter filter/purifiers and in-line gas monitors.

I claim:

1. Apparatus for isolating and containing gas reactive materials comprising:

a housing having an inlet in and an outlet fitting adapted for connecting said housing to a supply of gas;

a gas reactive material contained within said housing;

said inlet and said outlet fitting each including actuator means connected to a preloaded metal diaphragm within said housing, said diaphragm being biased to engage a metal seat when said apparatus is not connected to said gas supply to seal said reactive material from the ambient environment;

said actuator means being a solid metal rod including a gas passageway for fluid communication between said housing and said gas supply, said gas passageway being a slot in end of the actuator means adjacent the inlet fitting, said slot communicating with a central bore of the housing surrounding the actuator means, and said actuator means extending beyond said fitting at an end remote from said housing such that when said apparatus is connected to said gas supply said actuator means is displaced with sufficient force to overcome the preloaded force of said diaphragm thereby exposing said gas supply to said reactive material.

2. The apparatus of claim 1 wherein said metal seat is located on said housing.

3. The apparatus of claim 1 wherein said metal seat is located on the surface of said metal diaphragm opposite that of the interior of said housing.

4. The apparatus of claim 1 wherein said reactive material comprises an organometallic resin.

5. The apparatus of claim 1 wherein said actuator means is a metal tube in contact with said diaphragm.

6. The apparatus of claim 5 wherein said actuator means is welded to said diaphragm.

7. The apparatus of claim 5 wherein said tube includes a plurality of radial openings spaced along the length of said tube.

8. The apparatus of claim 5 wherein the end of said tube remote from said housing is outwardly flared.

9. The apparatus of claim 8 including a gasket inserted in said fitting circumferentially contacting said flared remote end thereby minimizing the force necessary to actuate said diaphragm when said apparatus is connected to said gas supply.

10. The apparatus of claim 2 wherein said metal diaphragm is made of a high yield, high tensile strength metal alloy.

11. The apparatus of claim 10 wherein said metal alloy comprises a mixture of cobalt, chromium and nickel.

12. The apparatus as in claims 1, 2, 3, 4, 5, 6, 7, 8, 9, 10 or 11 further including an integral filter for removing submicron particles disposed with in said housing.

* * * * *